United States Patent [19]

Cone

[11] Patent Number: 4,998,307
[45] Date of Patent: Mar. 12, 1991

[54] CONVERTIBLE INFANT RESTRAINT DEVICE

[75] Inventor: Richard E. Cone, Dayton, Ohio

[73] Assignee: Cosco, Inc., Columbus, Ind.

[21] Appl. No.: 256,040

[22] Filed: Oct. 11, 1988

[51] Int. Cl.⁵ .............................................. A47D 7/04
[52] U.S. Cl. .............................................. 5/94; 5/101; 297/250; 297/183; 297/484
[58] Field of Search .......................... 5/94, 101, 102; 297/250, 255, 256, 216, 464, 473, 310, 368, 369, 483, 484, 183

[56] References Cited

U.S. PATENT DOCUMENTS

| | | |
|---|---|---|
| 567,096 | 9/1896 | Harvey et al. |
| 2,286,784 | 6/1942 | Benzick .................. 297/368 |
| 2,664,140 | 12/1953 | Kindelberger ........... 155/11 |
| 2,676,336 | 4/1954 | Gilmer ........................ 5/94 |
| 2,777,502 | 1/1957 | Travis ...................... 155/10 |
| 2,845,234 | 7/1958 | Cushman et al. ......... 242/107.4 |
| 3,054,637 | 9/1962 | Pambello ................. 297/256 |
| 3,159,850 | 12/1964 | Aldrich et al. ............. 5/94 |
| 3,361,475 | 1/1968 | Villiers .................... 297/386 |
| 3,366,294 | 1/1968 | Stephenson .............. 224/29 |
| 3,381,315 | 5/1968 | Glassberg .................. 4/142 |
| 3,385,633 | 5/1968 | Aizley ..................... 297/389 |
| 3,579,673 | 5/1971 | Hirschey ..................... 5/94 |
| 3,833,946 | 9/1974 | Von Wimmersperg ...... 5/94 |
| 3,994,513 | 11/1976 | Courtis et al. ............ 280/747 |
| 4,186,961 | 2/1980 | Farrell ..................... 297/216 |
| 4,231,612 | 11/1980 | Meeker ................... 297/250 |
| 4,376,551 | 3/1983 | Cone ....................... 297/250 |
| 4,436,341 | 3/1984 | Converse ................ 297/250 |
| 4,500,133 | 2/1985 | Nakao ..................... 297/250 |
| 4,500,135 | 2/1985 | Kincheloe ............... 297/250 |
| 4,501,032 | 2/1985 | Heath ........................ 5/94 R |
| 4,615,562 | 10/1986 | Bell et al. ................ 297/250 |
| 4,709,960 | 12/1987 | Launes ................... 297/250 |
| 4,743,063 | 5/1988 | Foster, Jr. |
| 4,754,999 | 7/1988 | Kain ....................... 297/250 |
| 4,762,364 | 8/1988 | Young .................... 297/250 |

FOREIGN PATENT DOCUMENTS

| | | |
|---|---|---|
| 00094391A | 4/1980 | European Pat. Off. |
| 2651141 | 5/1977 | Fed. Rep. of Germany ....... 5/94 R |
| 3445497 | 6/1988 | Fed. Rep. of Germany ...... 297/484 |
| 2306853 | 11/1976 | France ..................... 5/94 R |
| 2347010 | 11/1976 | France . |
| 8602050 | 4/1986 | PCT Int'l Appl. ............... 297/484 |
| 1424093 | 2/1976 | United Kingdom .............. 297/396 |
| 2072003A | 9/1981 | United Kingdom . |

Primary Examiner—Gary L. Smith
Assistant Examiner—F. Saether
Attorney, Agent, or Firm—Barnes & Thornburg

[57] ABSTRACT

An infant restraint device is provided for securing and supporting an infant inside a motor vehicle. The device includes a shell assembly having upper and lower shell portions pivotally coupled together. The upper shell portion can be positioned in either a first generally planar orientation or in a second angular orientation with respect to the lower shell portion. A locking mechanism is provided for securing the upper and lower shell portions together in either the first or second orientations. In the first generally planar orientation, the device provides a car bed for the infant. In the second angular orientation, the device provides a standard rear-facing infant seat. A collapsible lower support surface provides a seat for the infant when the device is in the angular orientation. The lower support surface bends along a flexible portion when the upper shell portion of the device moves to the planar orientation to provide a generally planar support surface for the infant. The infant is held in position within the device by a lower strap and first and second shoulder straps. A slide mechanism is provided to permit lateral movement of the first and second shoulder straps with respect to the shell assembly without misaligning or tangling the shoulder straps. An adjustment strap is provided for simultaneously adjusting the position of the lower strap and the first and second shoulder straps after the infant is situated inside the shell assembly.

11 Claims, 3 Drawing Sheets

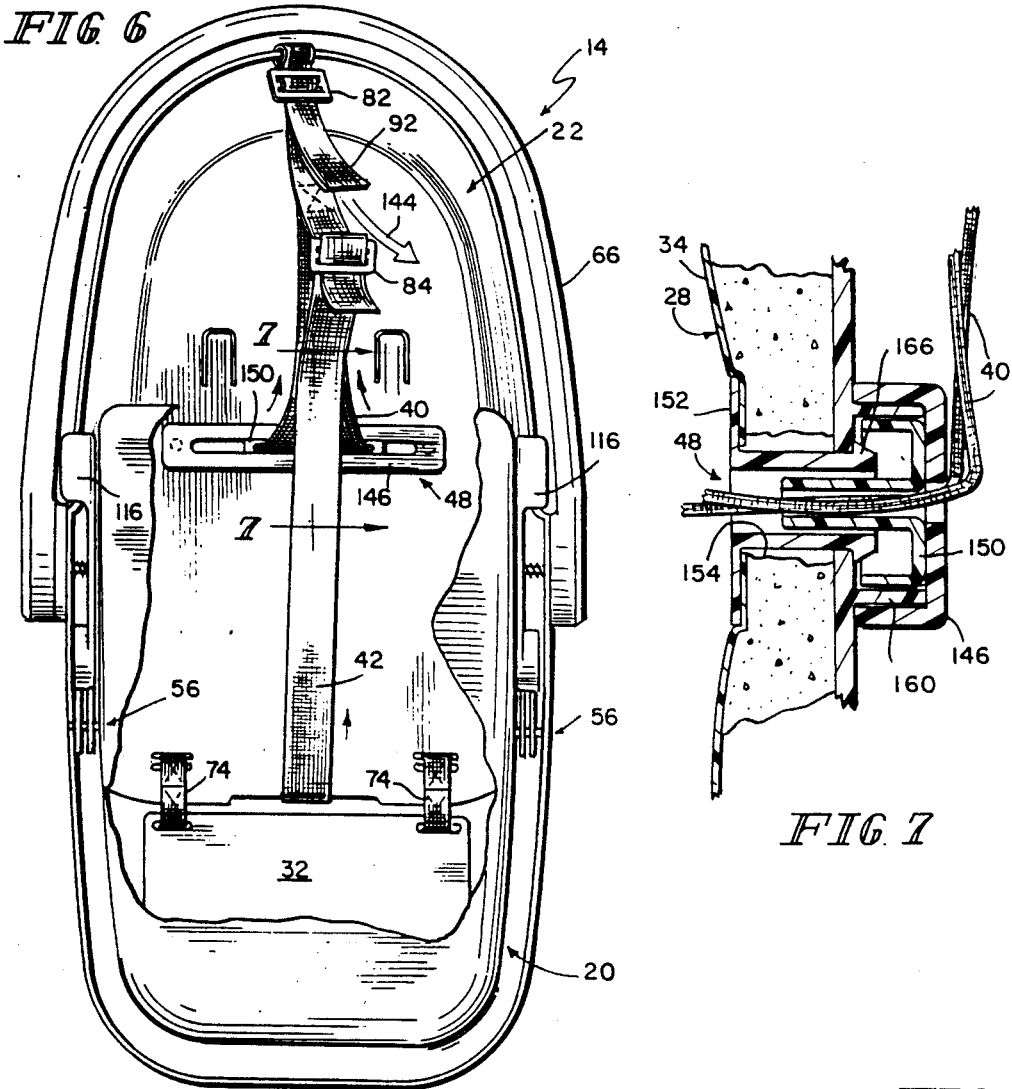
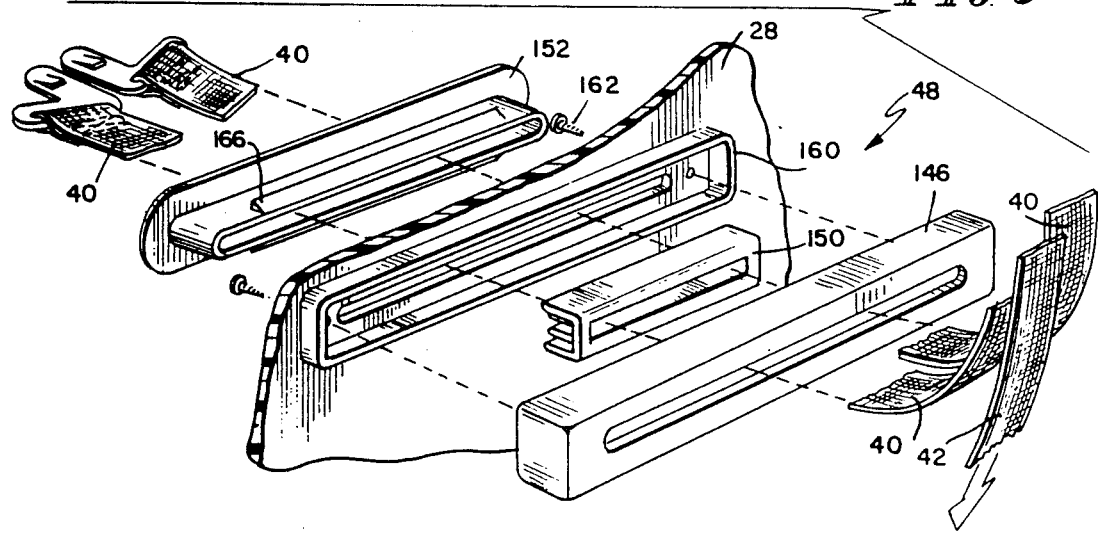

CONVERTIBLE INFANT RESTRAINT DEVICE

BACKGROUND AND SUMMARY OF THE INVENTION

The present invention relates to infant vehicle restraint devices More particularly, the present invention relates to an infant restraint device which can be used both as an infant car bed and as a standard rear-facing infant seat, with the device easily convertible between the two configurations.

It has been recognized for some period of time that it is desirable, and in some instances necessary, to transport small infants in a prone position in a motor vehicle. In such instances, it is of utmost importance to be able to secure the infant adequately within the motor vehicle The ability to transport small infants in a motor vehicle safely is desirable for several reasons. First, most healthy newborn infants under a certain age are much more comfortable and more easily transported in a position in which they can sleep in the supine position. Most conventional car seats are not designed to support very young infants while they are sleeping, at least not in a comfortable position. Second, for premature or low birth weight infants, it is not only desirable, but often mandatory to transport such infants in a supine position. Additionally, certain medically fragile infants must also be transported in a supine or prone position, not only for the comfort of the infant but also to avoid any complications with any of the medical problems of the infant Finally, infants with certain breathing disorders, such as apnea, need to be transported in a prone position to ensure that they can breathe adequately.

It would be advantageous to provide an infant car bed which could be used for all of the types of infants described above, but which could be converted into a standard rear-facing infant seat when the infant grows beyond a weight of approximately 14 pounds. Such a convertible infant restraint device could then be used for a long period of time and thus, the demand for such a device would be increased.

Thus, one object of the present invention is to provide an infant restraint device that can be used as a car bed that is designed to adequately protect infants, even medically fragile infants, in the event of a collision, with the device being convertible to a rear-facing infant seat for older infants.

Another object of the present invention is to provide an infant restraint device which includes an assembly within the device to secure the infant within the device both while the device is being utilized as a bed and as a rear-facing seat.

Yet another object of the present invention is to provide an infant restraint device in which the securing assembly permits controlled lateral movement of the infant within the device while preventing movement of the infant which could cause the infant to be thrown from the device. Such controlled lateral movement, in cooperation with side restraints on the device, increases the crashworthiness and protective capabilities of the device.

According to the present invention, an infant restraint device for use in a motor vehicle is provided. The device includes a generally rigid shell assembly for receiving an infant, with the shell assembly having a lower shell portion and an upper shell portion. Means are provided for pivotally coupling the lower shell portion to the upper portion to permit the shell assembly to be alternately positioned in either a substantially planar configuration or in an angled configuration.

One feature of the foregoing structure is that the restraint device includes a generally rigid shell which has an upper and lower portion that are pivotally coupled so that the shell can be positioned in either a planar configuration or an angled configuration. One advantage of the foregoing structure is such that the restraint device can be utilized as both a car bed for small infants and as a standard rear-facing restraint device for older infants.

In preferred embodiments of the present invention, the coupling means for coupling the lower shell portion to the upper shell portion includes locking means for selectively locking the shell assembly in either the planar configuration or the angled configuration. One feature of the foregoing structure is that a lock is provided for retaining the two shell portions in either the planar configuration or the angled configuration Also in preferred embodiments of the present invention, the device includes means for controllably securing the infant within the device. The securing means includes a harness arrangement that includes upper shoulder straps and a lower strap, with guiding means being provided for receiving the upper shoulder straps and the lower strap to permit controlled movement of the straps in a lateral direction. One feature of the foregoing structure is that the securing means within the device provides for controlled lateral movement of the infant during a collision or other abnormal condition of the vehicle. One advantage of the foregoing structure is that, by providing for controlled lateral movement of the infant, the side portions of the device cooperate with the harness arrangement to cushion and dissipate any forces imposed on the infant, thereby increasing the crash protection and protective capabilities of the device.

Thus, the present invention provides an infant restraint device which can be used as a protective car bed for transporting small infants under a certain weight, and for transporting various types of medically fragile infants. Additionally, the device can be easily converted to a conventional rear-facing car seat for use with the infant after the infant has grown beyond the specified weight during which the car bed configuration can be used. By providing an infant restraint device which is convertible between a car bed and a rear-facing seat, such a device can be used for a much longer period of time.

'Additionally objects, features, and advantages of the invention will become apparent t those skilled in the art upon consideration of the following detailed description of a preferred embodiment exemplifying the best mode of carrying out the invention as presently perceived. The detailed description particularly refers to the accompanying figures in which:

BRIEF DESCRIPTION OF THE DRAWINGS

FIG. 6 is a bottom view of FIG. 1 with portions broken away illustrating the harness assembly and its adjustment features;

FIG. 7 is a sectional view taken along lines 7—7 of FIG. 6 illustrating the harness slide assembly, and;

FIG. 8 is an exploded perspective view of the harness slide assembly.

DETAILED DESCRIPTION OF THE DRAWINGS

Figure 1:
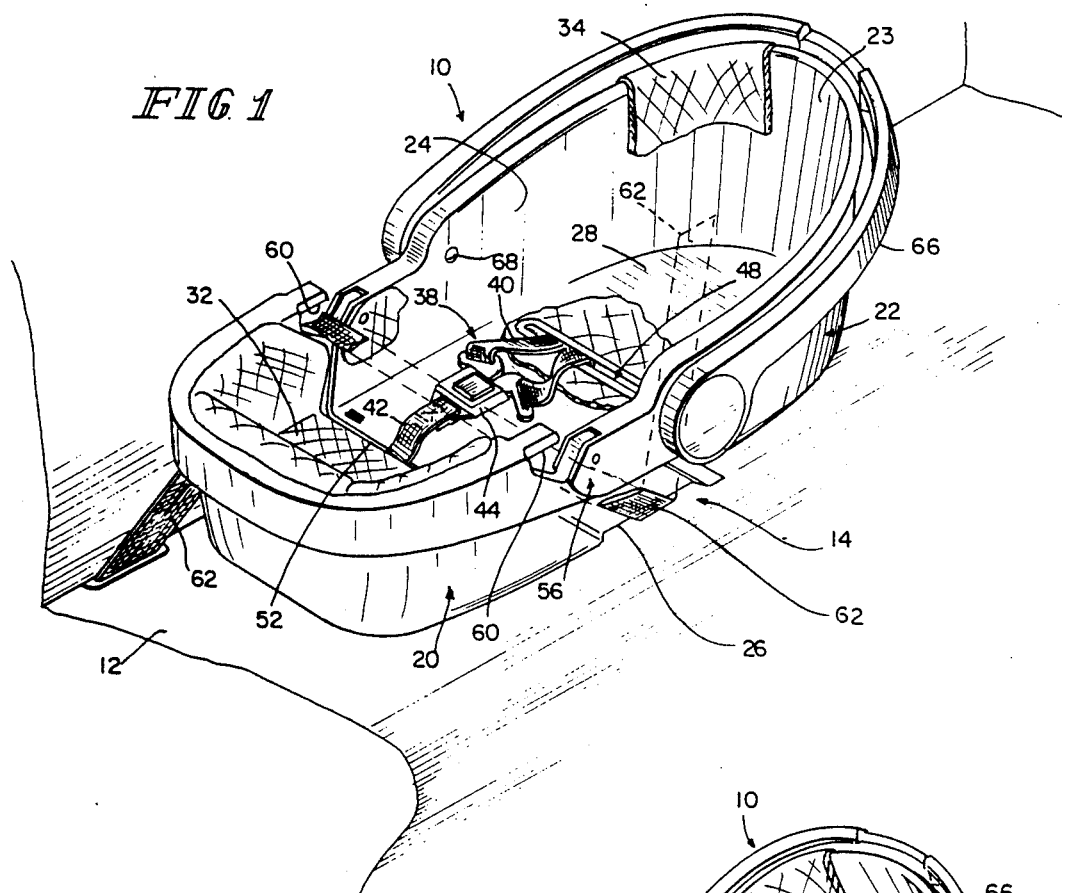
FIG. 1 is a perspective view of the convertible infant restraint device positioned in the car bed orientation and shown placed in the rear seat of a motor vehicle.
Figure 2:
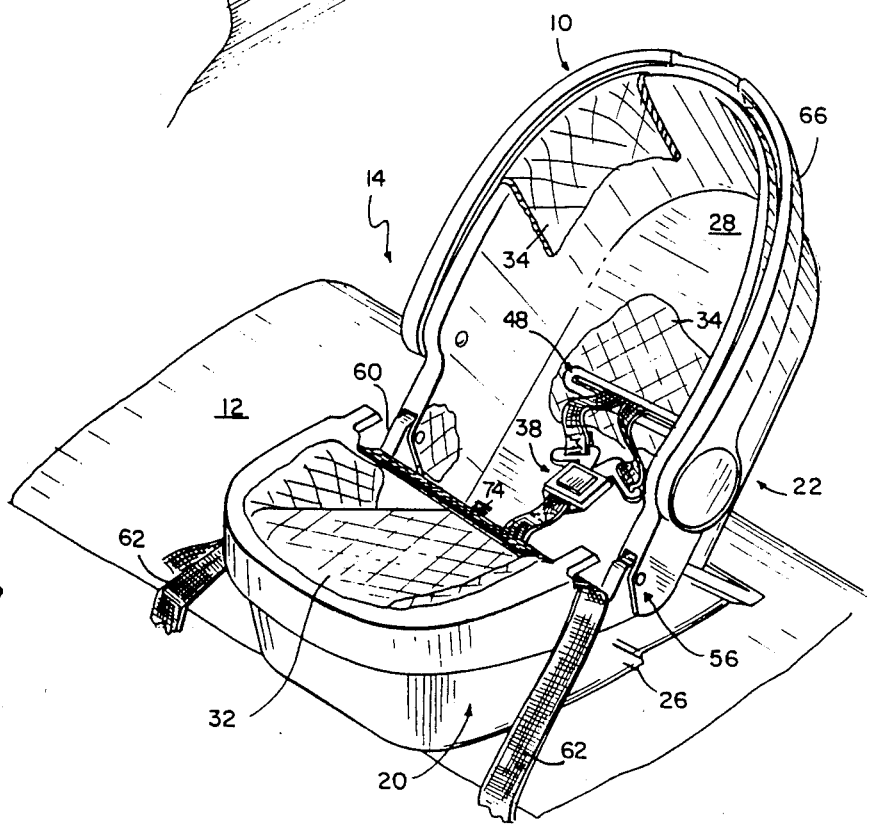
FIG. 2 is a perspective view of the present invention in the rear-facing car seat orientation.

Referring now to the drawings, FIG. 1 shows a convertible infant restraint device 10 according to the present invention. The device 10 is capable of being utilized both as a car bed which is illustrated in FIG. 1, and as a standard rear-facing car seat which is illustrated in FIG. 2. FIG. 1 shows the device 10 mounted on a passenger motor vehicle seat 12, with the head portion of the device 10 oriented toward the center of the motor vehicle.

The device 10 includes a generally rigid shell assembly 14 which includes a lower shell portion 20 and an upper shell portion 22. The upper shell portion 22 is configured to receive an upper portion of an infant (not shown), while the lower shell portion 20 is configured to receive the lower portion of the infant. The lower shell portion 20 and upper shell portion 22 are pivotable with respect to each other to permit the shell assembly 14 to be oriented in either a generally planar configuration as shown in FIG. 1, or an angled configuration as shown in FIG. 2. The pivoting mechanism will be described below in the discussion related to FIGS. 4 and 5.

The upper shell portion 22 includes a head portion 23 with depending side wall portions 24. As illustrated in FIG. 1, the side wall portions 24 increase in height toward the head portion 23. This increase in height of the side wall portions 24 toward the head portion 23 provides additional protective characteristics for the infant, and particularly for the infant's head area. The lower shell portion 20 includes a base portion 26 which serves as a support for the device 10.

An upper support surface 28 is included in the upper shell portion 22 which cooperates with a lower support surface 32 which is provided in the lower shell portion 20 to support the infant. The upper support surface 28 and lower support surface 32 cooperate to support the infant both in the planar configuration as shown in FIG. 1, and in the angled configuration as shown in FIG. 2. The lower support surface 32 changes in configuration between the planar configuration and the angled configuration in response to the necessity of providing a seat portion for the infant when in the angled configuration. This change in configuration of the lower support surface 32 will be described below in the discussion related to FIGS. 3 and 4. Illustratively, in the preferred embodiment, a padded cover 34 is provided which covers the inside of the shell assembly 14 to provide comfort and additional protection for the infant.

A harness assembly 38 is provided for securing the infant within the shell assembly 14. The harness assembly 38 includes two shoulder straps 40 and a lower crotch strap 42 which terminates in a harness buckle 44. The two shoulder straps 40 lock into the harness buckle 44 in a conventional manner and cooperate with the lower strap 42 to secure the infant within the shell assembly 14 when the shell assembly 14 is in both the planar configuration (FIG. 1) and the angled configuration (FIG. 2). Because of unique characteristics with the harness assembly 38 which will be discussed below in the discussion related to FIGS. 4 and 6, no adjustment of the harness assembly 38 is necessary when the shell assembly 14 is converted between the planar configuration and the angled configuration. This is advantageous because, with the infant in place and securely strapped in the planar configuration, the shell assembly 14 can be converted to the angled configuration as shown in FIG. 2 without any adjustment of the harness assembly 38 or any repositioning of the infant required.

It has been found that it is desirable to allow the infant to controllably slide toward one of the two side wall portions 24 when exposed to lateral deceleration forces. By permitting the infant to slide controllably toward one of the side wall portions 24, such lateral deceleration forces can be dissipated against the side wall portion 24 and the padded cover 34 to protect the infant, and to prevent the infant from being injured by the harness assembly 38. Under lateral deceleration forces, it is possible for an infant's shoulders to actually roll out from under the shoulder straps 40 if the harness assembly 38 does not permit such sliding movement toward the side wall portions 24. The harness assembly 38 includes a sliding arrangement to permit such lateral sliding movements under lateral deceleration forces. An upper strap slot assembly 48 is provided in the upper support surface 28 to permit the shoulder straps 40 to move laterally. Additionally, a lower strap slide 52 is provided to permit the lower strap 42 to move laterally. By providing the upper strap slot assembly 48 and the lower strap slide 52, the harness assembly 38 and occupant are permitted to move laterally toward one of the two side wall portions 24 under lateral deceleration forces. However, the harness assembly 38 is configured to prevent any outward movement of the infant away from the shell assembly 14. Thus, the infant is restrained against outward movement away from the shell assembly 14 by the harness assembly 38, however limited lateral movement of the infant is permitted by the sliding feature of the harness assembly 38. More specific details to the structure of the sliding harness assembly 38 will be described below in the discussion related to FIGS. 6–8.

A pivot arrangement 56 is provided to pivotally attach the upper shell portion 22 to the lower shell portion 20. This pivot arrangement 56 permits the upper shell portion 22 to be pivoted away from the generally planar configuration shown in FIG. 1 to the angled configuration shown in FIG. 2. Again, by permitting the upper shell portion 22 to be pivoted away from the planar configuration shown in FIG. 1, the shell assembly 14 can be positioned to an angled orientation as shown in FIG. 2 to permit the device 10 to be used as a standard rear-facing car seat for infants once the infant has grown beyond the size where the car bed configuration (FIG. 1) can be used safely. Illustratively, it has been found that the device 10 can be utilized in the car bed configuration as illustrated in FIG. 1 for infants from birth up to approximately 12-14 pounds in weight. Additionally, the device 10 can be used in the car bed configuration for low birth weight infants who weigh as little as 4¾ pounds. The device 10 can be utilized in the angled configuration illustrated in FIG. 2 as a standard rear-facing car seat for infants up to 20 pounds in weight.

Recesses 60 are provided in the lower shell portion 20 to receive a standard vehicle seat belt 62. As shown in FIG. 1, the proper positioning of the device 10 when in a car bed configuration is with the head portion 23 of the shell assembly 14 oriented toward the center of the motor vehicle (not shown). The vehicle seat belt 62 is then routed through the recess 60 closest to the seat back, across the lower portion of the infant, through the opposite recess 60, and then beneath the lower shell portion 20 and upper shell portion 22 and then attached in a normal manner to the opposite end of the seat belt 62. In this position, the infant's head is located near the center of the motor vehicle, which has been found to be the safest location for crash protection.

A curved handle 66 is provided which pivots on pins 68 located in the upper shell portion 22. The handle 66 is adjustably moveable to act as either a carrying handle or as a rocking support for the shell assembly 14, if desired. The mechanism for adjustably moving the handle 66 will be discussed later in the discussion related to FIG. 4. In general, it will be understood that the handle 66 can be oriented upwardly to serve as a handle to carry the shell assembly 14 when in both the car bed configuration and the angled seat configuration. If the handle 66 is moved downwardly from the position illustrated in FIG. 1, it can serve as a curved base to partially support the shell assembly 4. By functioning as a curved base, the shell assembly 4 can be rocked from side to side, both in the configuration illustrated in FIG. 1 and in the configuration illustrated in FIG. 2.

FIG. 2 shows the convertible infant restraint device 10 configured as a standard rear-facing car seat. Specifically, the upper shell portion 22 has been pivoted about the pivot arrangement 56 to form the angled orientation shown in FIG. 2. The details of the pivot arrangement will be discussed later in the discussion related to FIG. 5. In the angled configuration shown in FIG. 2, the base portion 26 of the lower shell portion 20 serves as a support for the entire shell assembly 14. As discussed above, the harness assembly 38 functions to properly restrain the infant from movement away from the shell assembly 14, but permits lateral movement when the infant is exposed to lateral deceleration forces without any adjustment from the configuration shown in FIG. 1. The device 10 is secured to the motor vehicle seat 12 by routing the seat belt 62 through the two recesses 60 in a conventional manner. In the preferred embodiment, the device 10 must only be used as a rear-facing seat when in the angled configuration. As can be seen, the lower support surface 32 is angled somewhat to serve as a seat for the infant in the angled configuration. The change in configuration and placement of the lower support surface 32 between the configuration illustrated in FIG. 1 and the configuration illustrated in FIG. 2 occurs automatically upon pivoting of the upper shell portion 22. This reorientation of the lower support surface 32 upon movement of the upper shell portion 22 will be discussed below in the discussion related to FIGS. 3 and 4. Again, in the angled configuration, the device 10 can be utilized with infants up to a weight of approximately 20 pounds.

Figure 3:
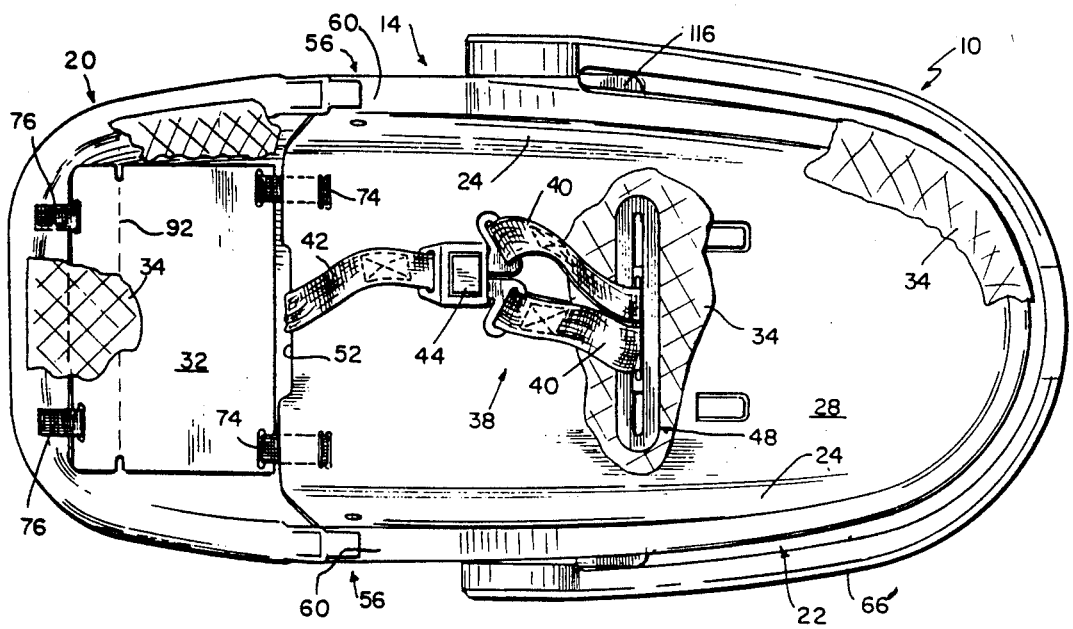
FIG. 3 is a top plan view of FIG. 1 with portions of the cover removed for clarity.

FIG. 3 shows in greater detail the arrangement of the harness assembly 38, and also the structure of the lower support surface 32, and its connection to the upper support surface 28. Specifically, the lower support surface 32 is flexibly coupled to the upper support surface 28 by flexible straps 74. The bottom end of the lower support surface 32 is attached to the lower shell portion 20 by flexible straps 76. A space is created between the lower support surface 32 and the upper support surface 28 to form the lower strap slide area 52.

Figure 4:
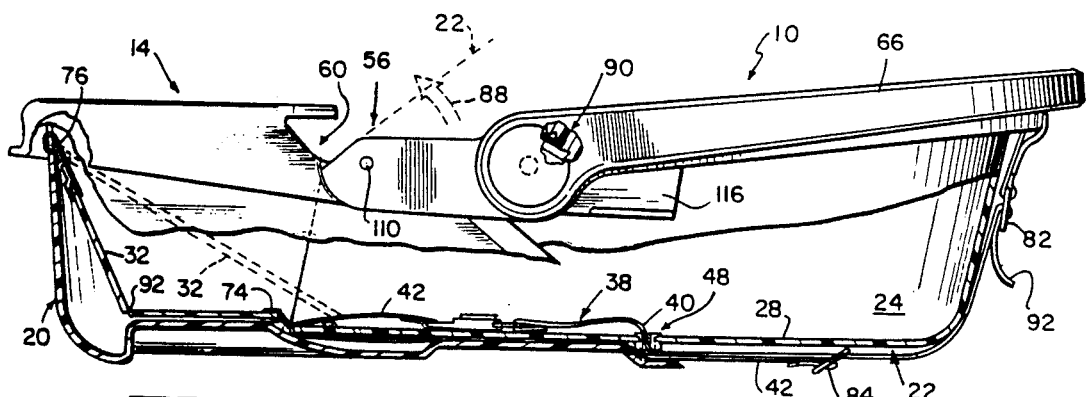
FIG. 4 is a side elevational view of FIG. 3 with the lower portion broken away.

FIG. 4 illustrates the routing and configuration of the harness assembly 38, and also illustrates in dotted line the repositioning of the lower support surface 32 when the upper shell portion 28 is moved to the angled orientation to form the standard rear-facing seat assembly. Specifically, when the upper shell portion 22 is rotated in the direction of arrow 88, the upper support surface 28 moves the lower support surface 32 through the flexible straps 74 to the orientation illustrated in dotted line. In this configuration, the lower support surface 32 forms a seat area for the infant which is necessary when the device 10 is in the angled orientation. When the device 10 is in the planar configuration illustrated in FIG. 4 in solid line, the lower support surface 32 is an angled member, with the angle created by a flexible portion 92 formed in the lower support surface 32. When the upper shell portion 22 is rotated in the direction of arrow 88 to the angled orientation illustrated in FIG. 2, the upper support surface 28 pulls the lower support surface 32 to a straight orientation by the straps 74 because of the movement of the upper support surface 28 away from the lower shell portion 20. When the upper shell portion 22 is locked in the angled orientation, the lower support surface 32 will be held in the straight orientation as shown in dotted line to form the seat for the infant.

The harness assembly 38 is a single adjustment arrangement which provides for easy adjustment of the assembly 38 by simply adjusting the length of the shoulder straps 40 by the use of a combined adjustment buckle 82. The lower strap 42 is attached to the shoulder straps 40 in a piggy-back arrangement and thus moves in unison with the shoulder straps 40. The position of the lower strap 42 with respect to the shoulder straps 40 can be adjusted using a lower strap adjustment buckle 84. Thus, when the infant is placed in the shell assembly 14, the first adjustment is the proper placement of the lower strap 42, and particularly the proper location of the harness buckle 44. This adjustment is made by adjusting the length of the lower strap 42 using the lower strap adjustment buckle 84. Once this adjustment has been probably made, the overall tightness of the harness assembly 38 is adjusted by lengthening or shortening the shoulder straps 40 using the combined adjustment buckle 82. As can be seen in FIG. 4, tightening the shoulder straps 40 using the combined adjustment buckle 82 will also tighten the lower strap 42 simultaneously. Conversely, loosening the shoulder straps 40 through the combined adjustment buckle 82 will simultaneously loosen the lower strap 42. Thus, accurate adjustments of the harness assembly 38 can be made to both the lower strap 42 and the shoulder straps 40 simultaneously, which greatly simplifies the adjustment of the harness assembly 38 to the proper configuration to properly restrain the infant within the shell assembly 14. FIG. 4 also shows the attachment of the handle 66 to the upper shell portion 22. Specifically, the handle 66 is attached to the upper shell portion 22 by a tooth arrangement 90 which permits selective angular adjustment of the handle 66 to any desired position.

Figure 5:
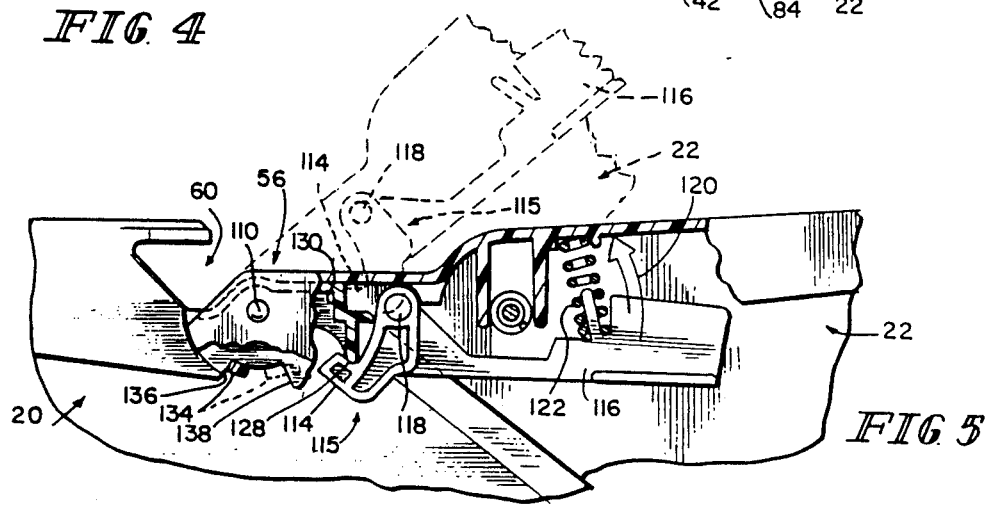
FIG. 5 is an enlarged portion of FIG. 4 with portions broken away to illustrate the structure of the latch assembly.

FIG. 5 illustrates the locking mechanism 115 for locking the upper shell portion 22 in one of the two orientations with respect to the lower shell portion 20 The pivot arrangement 56 includes a pivot pin 110 about which the upper shell portion 22 pivots with respect to the lower shell portion 20. A locking pawl 114 is provided which is attached to a lever arm 116 to lock the upper shell portion 22 in a either the planar configuration (shown in solid lines) or the angled configuration (shown in dotted lines). The lever 116 pivots about a pivot 118 and is moveable in the direction of arrow 120 against a resilient spring force provided by a spring 122. Thus, the spring 122 acts to keep the lever 116 in its lower position as illustrated in FIG. 5. With the upper shell portion 22 in its lowered position to form the planar configuration of the shell assembly 14, the locking pawl 114 cooperates with a downwardly extending finger 128 to lock the upper shell portion 22 in this planar configuration. The biasing force provided by the spring 122 acts to maintain the pawl 114 in the locked position.

To rotate the upper shell portion 22 upwardly toward the angled orientation, the operator first squeezes the lever 116 in the direction of arrow 120 against the resilient force of the spring 122. This unlocks the locking pawl 114 from the downwardly extending finger 128. The upper shell portion 22 is then manually moved upwardly toward the angled position illustrated in dotted line. When the upper shell portion 22 reaches the proper position, the lever 116 is released, and the locking pawl 114 is forced into a locking notch 130 which is formed in the lower shell portion 20 above the downwardly extending finger 128. The spring 122 acts to both force the locking pawl 114 into the notch 130, and to retain the pawl 114 in the notch 130 after the lever 116 has been released.

To ensure that the upper shell portion 22 is not rotated beyond its proper angled position as shown in dotted line, an outwardly extending arm 134 is provided which is attached to the upper shell portion 22 and which travels between a first shoulder 136 and a second shoulder 138. With the arm 134 butted against the first shoulder 136, any further downward movement of the upper shell portion 22 is prevented. As the upper shell portion 22 is rotated toward the angled orientation illustrated in dotted line, the movement is limited by the position of the second shoulder 138. Specifically, the second shoulder 138 acts to limit the movement of the arm 134 such that any further upward movement of the upper shell portion 22 beyond the desired position is prevented The position of the arm 134 when the upper shell portion 22 is rotated to the proper angled orientation is shown in dotted line. It will be understood that, although only one locking mechanism 115 is shown in FIG. 5, in the preferred embodiment there are two locking mechanisms 115, one on either side of the shell assembly 14.

FIG. 6 shows in greater detail the arrangement of the harness assembly 38 and its adjustment features, and also shows further details of the sliding features of the harness assembly 38. As discussed above, the harness assembly 38 includes a single strap adjustment feature which permits adjustment of both of the lower strap 42 and the shoulder straps 40 by a single adjustment, with both the lower strap 42 and shoulder straps 40 being moved simultaneously. Specifically, as the shoulder straps 40 are shortened by pulling on the end 92 in the direction of arrow 144, both the shoulder straps 40 and the lower strap 42 are shortened. Again, this single adjustment features provides for easy adjustment of the harness assembly 38 after the infant has been placed in the shell assembly 14. To permit the shoulder straps 40 to move laterally, a back plate 146 is attached to the underneath side of the upper support surface 28. The slot 48 is formed by this back plate 146. The function of the back plate 146 will be discussed in greater detail below in the discussion related to FIGS. 7 and 8.

FIG. 7 shows in greater detail the attachment of the back plate 146 to the upper support surface 28, and the routing of the shoulder straps 40 through the slot assembly 48. A movable strap slide 150 is provided through which the shoulder straps 40 are routed and retained. The strap slide 150 is captured for movement between the back plate 146 and a track 160 which is formed as a part of the underneath side of the upper support surface 28. The strap slide 150 permits the shoulder straps 40 to move laterally, while still maintaining the proper placement of the shoulder straps 40 around the infant. It will be understood that, in the absence of the strap slide 150, the shoulder straps 40 could become tangled or otherwise misaligned while moving in the slot assembly 48. A front locking plate 152 is provided which is placed in a hole 154 in the upper support surface 28 and which engages the track 160. Thus, the front locking plate 152, the track 160, and the strap slide 150 cooperate to form the slot assembly 48. The front locking plate 152 includes elongated, spaced-apart projections which terminate in locking ribs 166. These locking ribs 166 snap into place in the track 160 after the front locking plate 152 has been inserted through the hole 154. The locking ribs 166 thus act to both properly position the front locking plate 152, and to retain the locking plate 152 in the proper position and orientation.

FIG. 8 shows in still greater detail the orientation of the front locking plate 152, the track 160, the strap slide 150, and the back plate 146. FIG. 8 shows that the back plate 146 is attached to the upper support surface 28 by screws 162. The strap slide 150 is captured between the track 160 and the back plate 146. After the back plate 146 has been attached to the upper support surface 28 by the screws 162, the front locking plate 152 is inserted through the hole 154, with the locking ribs 166 engaging the track 160 to properly position the front locking plate 152. With the shoulder straps 40 routed through the back plate 146, the strap slide 150, the track 160, and the front locking plate 152, controlled lateral movement of the shoulder straps 40 upon lateral deceleration forces is permitted.

Thus, the present invention provides an infant restraint device which functions both as an infant car bed for infants under approximately 14 pounds in weight, and for medically fragile infants, and which also converts to a standard rear-facing car seat for older infants. The device includes a floating or moving restraint system which cooperates with the sides of the device to dissipate lateral deceleration forces which might be imposed upon the infant. By permitting the device to be converted from an infant car bed to a standard rear-facing seat, the device can be used for a much longer period of time than a conventional car bed. Further, with the handle 66, the device can be used as carrier for transporting the child outside the vehicle.

Although the invention has been described in detail with reference to a preferred embodiment and specific examples, variations and modifications exist within the scope and spirit of the invention as defined in the following claims.

What is claimed is:

1. An infant restraint device, the device comprising a generally rigid shell assembly for receiving an infant, the shell assembly including side portions which aid in restraining the infant, the shell assembly having a lower shell portion and an upper shell portion, means for pivotally coupling the lower shell portion to the upper shell portion to permit the shell assembly to be alternatively positioned in a substantially planar configuration and in an angled configuration, means for controllably securing an infant within the upper shell portion of the restraint device, said securing means solely contacting the upper portion, and means for shifting an area of contact of the securing means with the upper portion for permitting limited controlled lateral movement of the infant toward the side portions.

2. The restraint device of claim 1, wherein the securing means comprises a harness arrangement that includes upper shoulder strap portions and a lower strap portion, and the shifting means comprises a first elongated slot in the upper shell portion for receiving the upper shoulder strap portions, a second slot in the upper shell for receiving the lower strap portion, both the first and second slots being oriented to extend toward the opposing side portions of the shell assembly, and slide means laterally movable with respect to the first elongated slot for receiving the upper shoulder strap portions to permit lateral sliding movement of the upper shoulder strap portions inside the first elongated slot.

3. A convertible infant restraint device for use in a motor vehicle, the device comprising a tub-like shell assembly that includes a lower supporting surface for supporting an infant and at least two opposite side walls, the shell assembly having a lower portion and an upper portion, the upper portion being pivotally coupled to the lower portion to permit the upper shell portion to be placed in a plurality of angular orientations with respect to the lower shell portion, means for locking the upper shell portion and the lower shell portion in a generally planar orientation such that the supporting surface is generally planar and in at least one other angular orientation such that the lower support surface forms an angle less than 180°, means for elevating a portion of the lower supporting surface when the upper shell portion and the lower shell portion are oriented in the at least one other angular orientating to provide a planar support surface for a lower part of the infant, and means for securing the infant to the upper shell portion, said elevating means being configured to operate independently of said securing means such that movement of the upper shell portion relative to the lower shell portion does not effect the means for securing the infant.

4. The restraint device of claim 3, further comprising means for guiding the securing means to permit limited lateral movement of the securing means in a direction toward the opposite side walls.

5. A restraint apparatus for restraining an infant within an infant restraint device, the apparatus comprising a generally rigid shell assembly having a lower shell portion and an upper shell portion pivotally connected to each other, a harness assembly including two shoulder straps and at least one lower strap, each of the two shoulder straps and the lower strap contacting the upper shell portion at specific positions, each shoulder strap having a width dimension, means for coupling the two shoulder straps to the at least one lower strap to capture an infant, first means for laterally guiding the two shoulder straps together so that each shoulder strap moves completely different lateral position which is spaced apart a distance greater than the width dimension of each shoulder strap from its specific position to permit lateral movement of the shoulder straps and the infant with respect to the restraint device.

6. The restraint apparatus of claim 5, further comprising second means for guiding the at least one lower strap to permit lateral movement of the least one lower strap and the infant.

7. The restraint apparatus of claim 5, wherein the first guiding means comprises an elongated upper slot assembly that is oriented to permit lateral movement of the shoulder straps to its completely different position.

8. An infant restraint device comprising a generally rigid shell assembly for receiving an infant, the shell assembly including a support surface for supporting the infant first and second shoulder straps for securing the infant inside the shell assembly, the shoulder straps extending through an aperture formed in the support surface, and slide means having means for receiving the first and second shoulder straps, the slide means being movable laterally with respect to the rigid shell assembly to permit the shoulder straps to move laterally within the aperture with respect to the shell assembly while preventing misalignment of the shoulder straps.

9. The device of claim 8, wherein the slide means includes a back plate formed to include an elongated aperture coupled to the shell assembly over the aperture in the shell assembly, and a strap slide disposed between the shell assembly and the back plate for movement between the back plate and the shell assembly, the strap slide receiving and holding the first and second shoulder straps in a spaced apart relation while sliding laterally with respect to the shell assembly inside a sliding region between the back plate and the shell assembly.

10. The device of claim 9, wherein the shell assembly is formed to include a track guiding sliding movement of the strap slide.

11. The device of claim 9, further comprising a front locking plate including locking ribs for insertion through the aperture formed in the shell assembly to secure the front locking plate to the shell assembly, the front locking plate including an elongated aperture to permit the first and second shoulder straps to pass through the front locking plate, through the strap slide, and through the back plate.

* * * * *

UNITED STATES PATENT AND TRADEMARK OFFICE
CERTIFICATE OF CORRECTION

PATENT NO. : 4,998,307
DATED : March 12, 1991
INVENTOR(S) : Richard E. Cone

It is certified that error appears in the above-identified patent and that said Letters Patent is hereby corrected as shown below:

Column 9, line 23 (Claim 2), after "shell", insert --portion--.

Column 9, line 49 (Claim 3), change "orientating" to --orientation--.

Column 10, line 12 (Claim 5), after "moves", insert --to a--.

Signed and Sealed this

Twenty-second Day of September, 1992

*Attest:*

DOUGLAS B. COMER

*Attesting Officer*  *Acting Commissioner of Patents and Trademarks*